Aug. 4, 1942.  O. SINGER  2,292,298
LOCOMOTION DEVICE FOR VEHICLES
Filed March 22, 1940    3 Sheets-Sheet 1
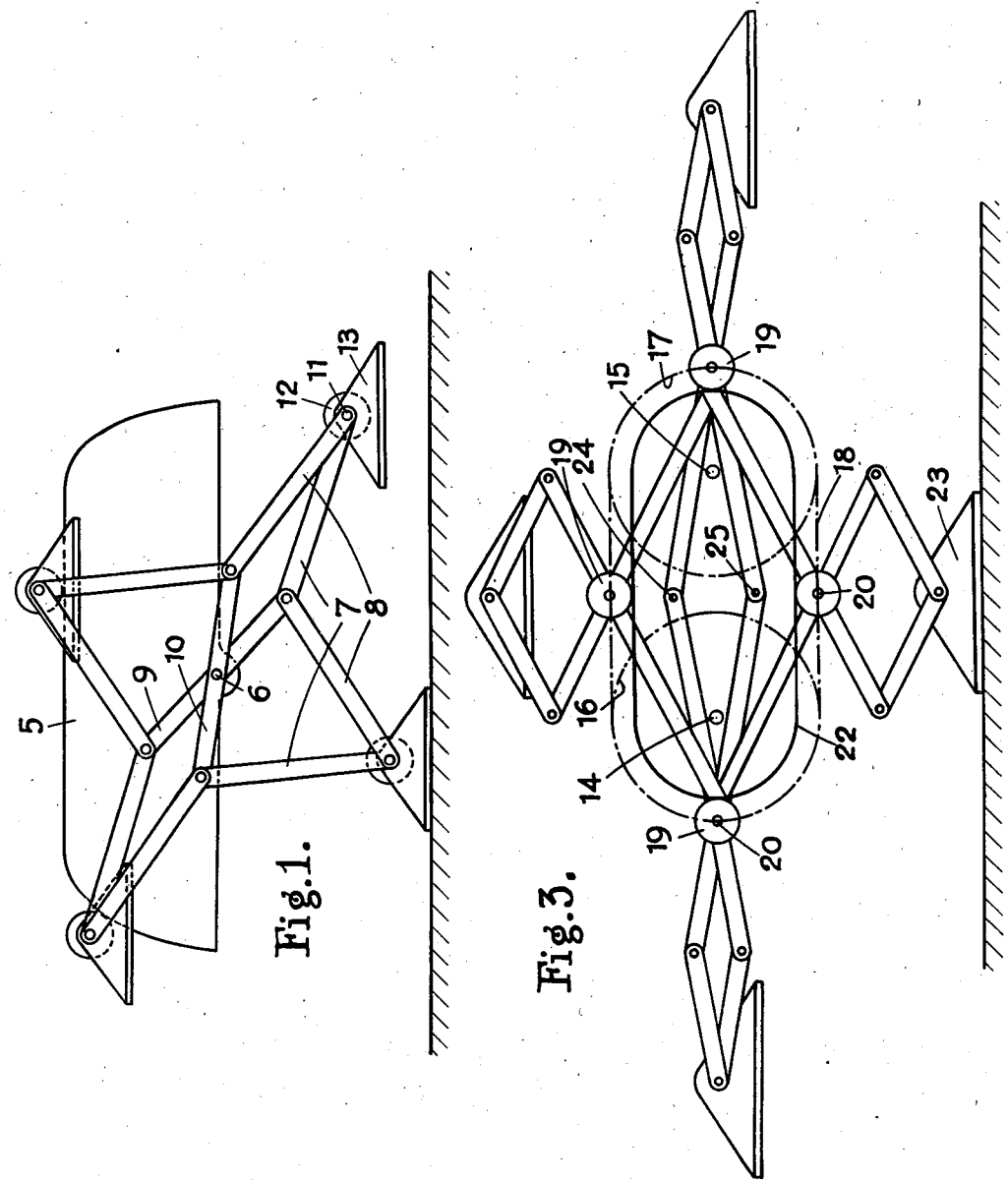
INVENTOR
OTTO SINGER

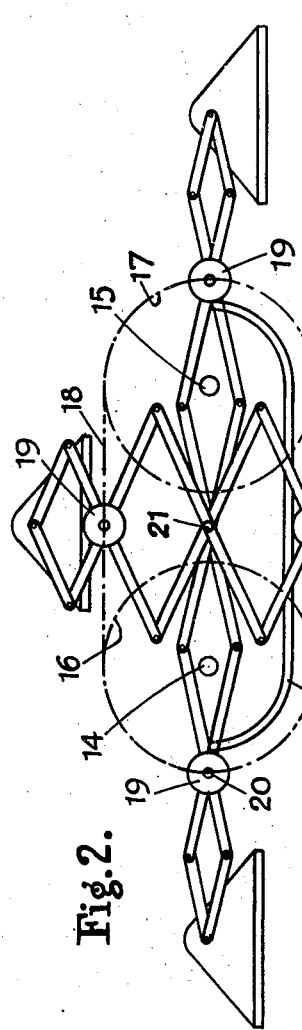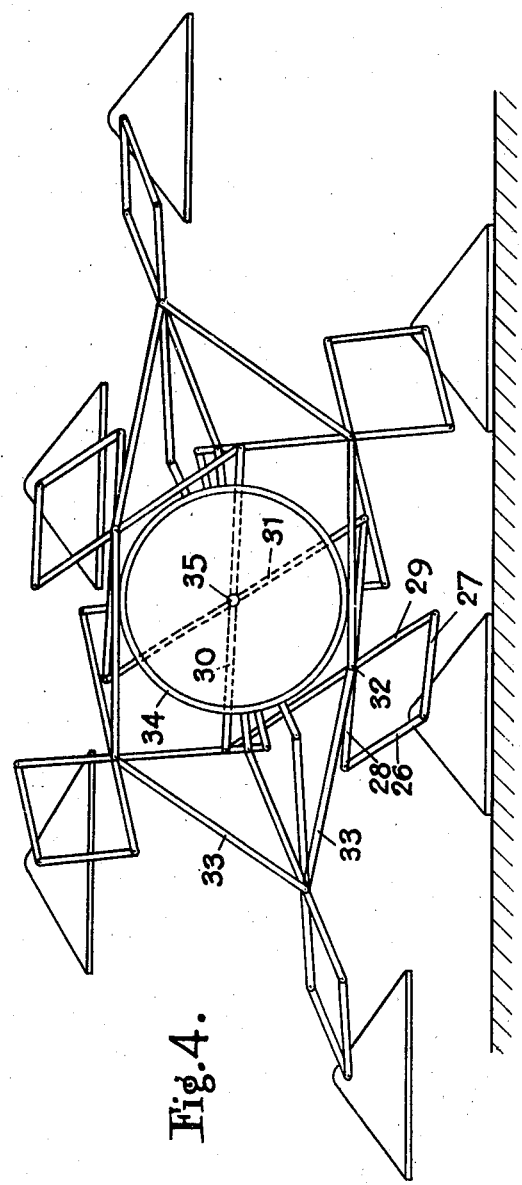

Aug. 4, 1942.　　　　O. SINGER　　　　2,292,298
LOCOMOTION DEVICE FOR VEHICLES
Filed March 22, 1940　　　3 Sheets-Sheet 3

INVENTOR
OTTO SINGER

Patented Aug. 4, 1942

2,292,298

UNITED STATES PATENT OFFICE 2,292,298

LOCOMOTION DEVICE FOR VEHICLES

Otto Singer, Burnham-on-Sea, Somerset, England

Application March 22, 1940, Serial No. 325,462
In Great Britain March 24, 1939

4 Claims. (Cl. 305—11)

This invention relates to locomotion devices for vehicles of the type comprising a plurality of track-engaging feet interconnected through articulations to move around a support fixed to the vehicle and progressively engage the track. The object of the invention is to provide a strong and comparatively simple method of mounting the feet on the support so that whilst they can solidly take up the load, they can neverthless vary their distance from the support during their travelling movement so as to ensure smooth track engagement with elimination of shock.

According to the invention the track-engaging feet of a locomotion device of the type set forth are secured to the support through the medium of linkage including a lazy-tongs lever system. In this respect the feet are preferably mounted on the terminal pivot of a lazy-tongs lever system, and one lazy-tongs system may be common to a pair of opposite feet.

The locomotion device may be so constructed that at most two feet can make contact with the ground or track simultaneously, an embodiment which is suitable for firm ground or a hard track, or the construction may be such that more than two feet make contact with the ground or track at a time, this construction being suitable for travel on soft, marshy or boggy ground.

In all embodiments, the ends of the spoke elements may be provided with suitable shoes or the like to afford distribution of pressure on the ground.

While the locomotion device according to the invention is primarily intended for vehicles which have to travel on rough or soft ground, such as military tanks, agricultural tractors and the like, it may be usefully employed in connection with other types of vehicles.

Various embodiments of the invention will now be described by way of example with reference to the accompanying drawings, wherein:

Figure 1 is a diagrammatic side elevation of a locomotion device of the lazy-tongs type according to which the lazy-tongs rotate about a fixed pivot and operate under the control of a fixed cam element.

Figure 2 is a view similar to Fig. 1 of an alternative embodiment of the invention in which the lazy-tongs rotate about a fixed pivot and operate under the control of a fixed cam element and a sprocket chain.

Figure 3 is a view similar to Fig. 1 of another alternative embodiment of the invention which is similar to the Fig. 2 embodiment, except that the lazy-tongs do not rotate about a fixed pivot.

Figure 4 is a view similar to Fig. 1 of another alternative embodiment of the invention according to which the respective lazy-tongs of the device are connected together by links and are controlled in their operation by a roller with which the links cooperate.

Figure 5:
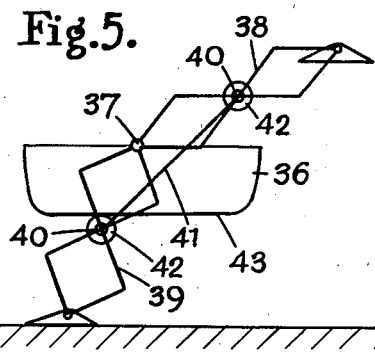
Figure 5 is a view similar to Fig. 1 of another alternative embodiment of the invention according to which links are employed to connect lazy-tongs as shown in Fig. 2 and in which operation of the lazy-tongs is under the control of a fixed pivot and a fixed cam element as in the Fig. 2 embodiment of the invention.

Referring to Figure 1, a rail element 5 is secured to the chassis of the vehicle (not shown), an axle 6 fixed to either the chassis or the element 5 being provided. This constitutes the support for the track-engaging feet 13. On the axle 6 is mounted in a freely rotatable manner the locomotion device proper, which consists of two lazy tongs arranged to contract and expand radially and forming four spokes at right angles to one another. Each pair of lazy tongs has two external limbs 7 and 8, the two inner limbs 9 and 10, which are crossed and mounted on the axle 6 at their centres being common to both pairs. The outer ends of each pair of members 7 and 8 have a common pivot 11, on which is mounted a roller 12. As the locomotion element formed by the lazy tongs rotates the rollers 12 engage the upper edge of the rail 5 one after the other, at least two rollers engaging the rail at a time and thus rendering the structure of the locomotion device rigid. The terminal pivots 11 also carry loosely mounted thereon the track-engaging feet in the form of shoes 13. It will be seen that in this arrangement feet 13 are interconnected through the articulations 7, 8, and the spokes formed by the lazy tongs expand and contract in length so as to maintain the axle 6 and therewith the chassis of the vehicle at a substantially constant distance from the ground.

The embodiment shown in Figure 1 is applicable to drawn vehicles only, which are not self-propelling. Figures 2 and 3 show embodiments which are applicable to self-propelling vehicles, although a vehicle equipped with locomotion devices shown in the latter figures may also be drawn.

Referring to the Figure 2, two spaced axles 14 and 15 are mounted in the chassis of the vehicle and either of said axles may be driven. Each axle has keyed thereto a sprocket wheel 16 and 17 respectively, on which is mounted a chain 18. The latter has mounted thereon in a freely rotatable manner four evenly spaced rollers 19, the rollers being mounted on chain link pivots 20, which are also pivots of lazy tongs similar to those described with reference to Figure 1. The lazy tongs rotate about a central pivot 21 fixed to the chassis of the vehicle. Secured to the chassis of the vehicle there is a rail 22, which is engaged by the rollers 19 in succession as the locomotion device rotates. Assuming the axle 14 to be driven, the chain 18 which interconnects the feet 23 is moved by the sprocket 16 and the spokes formed by the lazy tongs are rotated. The feet 23 are in the form of shoes and are mounted at the terminal pivots of the spokes to engage the ground at spaced intervals and thus the locomotion device causes the vehicles to be propelled along the ground.

The embodiment shown in Figure 3 is similar in every respect to that shown in Figure 2, except that the central connecting pin 21 for the lazy tong limbs is omitted and the ends of the corresponding limbs of two opposite lazy tongs are interpivoted as at 24 and 25. In Figures 1, 2 and 3 a single lazy-tongs system is common to a pair of opposite feet 13 (or 23).

In the embodiment shown in Figure 4 there are six pairs of lazy tongs, each comprising two outer end members 26 and 27, two intermediate members 28 and 29, and two inner members 30 and 31, which are common to two opposite pairs of tongs. The pivots 32 of the intersecting member 28 and 29 are interconnected by rails 33, one of which is always substantially parallel to the ground and which serve as a jointed track for a roller 34 loose on an axle 35 fixed in the chassis of the vehicle. The roller 34 may also be fast on its axle and the latter may be driven. The operation is similar to that described with reference to Figures 2 and 3 and will be readily understood.

In the embodiment shown in Figure 5 a rail 36 is fixed to the chassis of the vehicle and an axle 37 is fixed to the chassis or the rail 36. The spokes consist of two pairs of lazy tongs 38 and 39, the pivots 40 of which are interconnected by a link 41 and carry respective rollers 42 adapted to engage one after the other the lower edge 43 of the rail 36. The operation is similar to that already described in connection with previous embodiments and will be readily understood. It will be noted that only two feet are employed; as the roller 42 of one foot is moving from the undersurface of the rail member 36, the other roller commences to take up the load.

Figure 6:
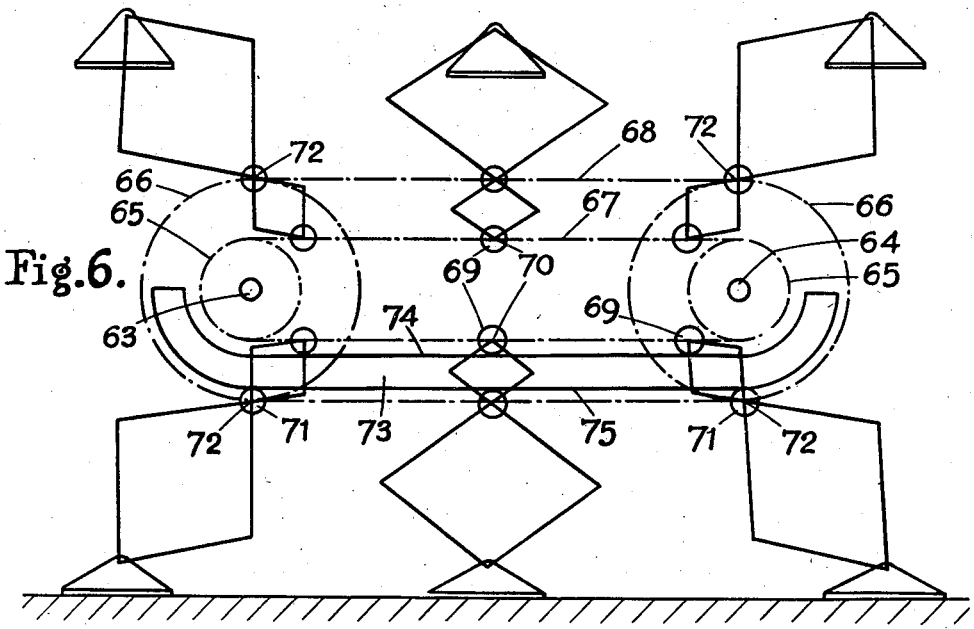
Figure 6 is a view similar to Fig. 1 of another alternative embodiment of the invention according to which a series of lazy-tongs, each independent of the others, are mounted on an endless chain and operate under the control of a fixed cam element.

In the embodiment shown in Figure 6 two spaced axles 63 and 64 are mounted in bearings fixed to the chassis of the vehicle and either of said axles may be driven. Each axle has keyed thereto two sprocket wheels 65 and 66 respectively. A chain 67 is mounted on and passes round the wheels 65 whilst a chain 68 is mounted on and passes round the wheels 66. The chain 67 has mounted thereon in a freely rotatable manner six evenly spaced rollers 69, the rollers being mounted on chain link pivots 70 which are also pivots of lazy tongs. In the present example six pairs of lazy tongs are provided, but this number can be altered if required. Similarly the chain 68 carries six evenly spaced rollers 71 mounted on chain link pivots 72 which again serve as pivots for the lazy tongs. Secured to the chassis of the vehicle there is a rail 73 which is engaged on both its edges 74 and 75 by the rollers 69 and 71 respectively and in succession as the locomotion device rotates. Assuming the axle 63 to be driven, the chains 67 and 68 are moved by the sprocket wheels 65 and 66 and the spokes formed by the lazy tongs are moved accordingly. The operation is similar to that described with reference to Figure 3.

Figure 7:
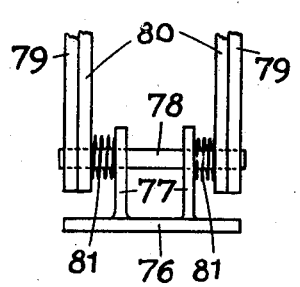
Figure 7 is a front elevation showing the manner of mounting one of the shoes on its related lazy-tongs.

Figure 7 illustrates an example of how a shoe can be mounted between the outermost limbs of each pair of lazy tongs so that the shoe is free to move laterally between said limbs when the vehicle is steered round corners or is caused to deviate from a straight line path. The shoe 76 is pivotally mounted by upwardly extending cheeks 77 upon a pivot pin 78 which connects the outermost elements 79 and 80 of a pair of lazy tongs. Compression springs 81 are interposed between the elements 80 and the cheeks 77. It will be readily understood that the shoe is thus permitted to move laterally between a pair of lazy tongs against the influence of the springs 81 by which it is returned to a normal central position.

Figure 8:
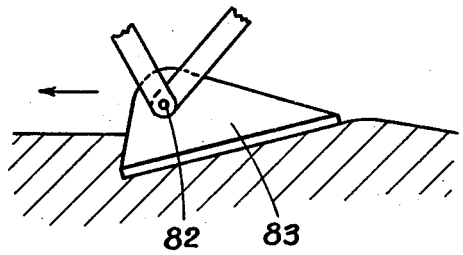
Figure 8 is a side elevation illustrating the manner of mounting one of the shoes on its related lazy-tongs.

By pivoting each shoe between a pair of lazy tongs so that the pivot pin 82 passes through the cheeks 83 of the shoe towards one end of the latter in a manner illustrated by Figure 8, the forward end of each shoe is caused to dig into the ground being traversed and thus the vehicle is prevented from skidding.

The embodiments illustrated and described are given solely by way of example only and many other constructional variations are conceivable within the scope of the invention claimed. For example the shoes may be connected to the lazy tongs by means of universal joints so that they are free to pivot in various directions and further the shoes may be shod with rubber or fitted with air cushions to provide pneumatic shoes. The lazy tongs may have any number of limbs according to the purpose for which the vehicle is intended.

I claim:

1. A locomotion device comprising a plurality of spokes each of lazy-tong form including articulated limbs, a fixed pivot to which the inner limbs of each spoke are directly pivotally connected at their inner ends and about which the respective spokes are swingable, a traction shoe mounted on the outer limbs of each spoke, and fixed cam means cooperating with said spokes to cause the same alternately to increase and decrease in length as they swing about said fixed pivot.

2. A locomotion device comprising a pair of spaced apart wheels, an endless element trained over said wheels, a plurality of spokes each of lazy-tong form including articulated limbs, a fixed pivot to which the inner limbs of each spoke are pivotally connected and about which the respective spokes are swingable, a traction shoe mounted on the outer limbs of each spoke, a connection between each spoke and said endless element, and fixed cam means cooperating with said spokes and with said endless element to cause the spokes to alternately increase and decrease in length as they swing about said fixed pivot.

3. A locomotion device comprising a plurality of spokes each of lazy-tong form including articulated limbs, a fixed pivot to which the inner limbs of each spoke are directly pivotally connected at their inner ends and about which the respective spokes are swingable, a traction shoe mounted on the outer limbs of each spoke, and means cooperating with said spokes to cause the same alternately to increase and decrease in length as they swing about said fixed pivot, said spokes being arranged in pairs extending in opposite directions from said fixed pivot and the inner limbs of opposed pairs of said spokes being rigid with each other.

4. A locomotion device as set forth in claim 2 in which the spokes are arranged in pairs extending in opposite directions from the fixed pivot and in which related inner limbs of opposed pairs of spokes are rigid with each other.

OTTO SINGER.